(12) United States Patent
Kobayashi et al.

(10) Patent No.: US 9,966,753 B2
(45) Date of Patent: May 8, 2018

(54) POWER SWITCHING DEVICE OPERATING TIME PREDICTION EQUIPMENT AND METHOD

(75) Inventors: Shoichi Kobayashi, Tokyo (JP);
Hiroyuki Tsutada, Tokyo (JP);
Masahiro Shikai, Tokyo (JP);
Tomohito Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 780 days.

(21) Appl. No.: 13/978,644

(22) PCT Filed: Feb. 2, 2011

(86) PCT No.: PCT/JP2011/000579
§ 371 (c)(1),
(2), (4) Date: Jul. 8, 2013

(87) PCT Pub. No.: WO2012/104910
PCT Pub. Date: Aug. 9, 2012

(65) Prior Publication Data
US 2013/0297255 A1 Nov. 7, 2013

(51) Int. Cl.
*H02H 1/00* (2006.01)
*H01H 9/56* (2006.01)
*H01H 33/59* (2006.01)

(52) U.S. Cl.
CPC ............ *H02H 1/0092* (2013.01); *H01H 9/56* (2013.01); *H01H 33/593* (2013.01); *H01H 2009/566* (2013.01)

(58) Field of Classification Search
CPC ............ G01R 31/3274; G01R 31/3275; H02H 3/044; H02H 7/222
See application file for complete search history.

(56) References Cited

U.S. PATENT DOCUMENTS

| 5,430,599 | A | * | 7/1995 | Charpentier | ......... H01H 33/593 361/152 |
|---|---|---|---|---|---|
| 5,650,931 | A | * | 7/1997 | Nii | ........................... B60K 6/46 180/65.245 |
| 5,767,886 | A | * | 6/1998 | Kawakami | ............... H04N 1/52 347/115 |
| 6,433,980 | B1 | | 8/2002 | Tsutada et al. | |
| 7,095,139 | B2 | | 8/2006 | Tsutada et al. | |

(Continued)

FOREIGN PATENT DOCUMENTS

| JP | 2000 011824 | 1/2000 |
|---|---|---|
| JP | 2001 135205 | 5/2001 |

(Continued)

OTHER PUBLICATIONS

International Search Report dated Mar. 8, 2011 in PCT/JP11/000579 Filed Feb. 2, 2011.

*Primary Examiner* — Kyle R Quigley
(74) *Attorney, Agent, or Firm* — Oblon, McClelland, Maier & Neustadt, L.L.P.

(57) ABSTRACT

An apparatus for predicting an operating time in a power device includes an operating characteristic parameter estimating unit, and only the operation historical data in the vicinity of a current operation environmental condition is extracted and input by a vicinity operation historical data extracting unit.

6 Claims, 6 Drawing Sheets

(56) References Cited

U.S. PATENT DOCUMENTS

| | | | |
|---|---|---|---|
| 2004/0167731 A1* | 8/2004 | Wang | H02J 3/00 702/60 |
| 2010/0254060 A1 | 10/2010 | Saito et al. | |
| 2011/0128005 A1* | 6/2011 | Weiher | H02H 3/044 324/424 |
| 2015/0073737 A1* | 3/2015 | Inuzuka | H02S 50/10 702/61 |

FOREIGN PATENT DOCUMENTS

| | | | |
|---|---|---|---|
| JP | 3986810 | | 10/2007 |
| JP | 2008 140690 | | 6/2008 |
| JP | 2009 238673 | | 10/2009 |
| JP | 2009238673 A | * | 10/2009 |
| JP | 2010 244780 | | 10/2010 |

* cited by examiner

POWER SWITCHING DEVICE OPERATING TIME PREDICTION EQUIPMENT AND METHOD

TECHNICAL FIELD

The present invention relates to an apparatus and a method for predicting an operating time in a power switching device such as a breaker.

BACKGROUND ART

In a power switching device such as a breaker, there is known an operating time prediction apparatus for predicting and controlling an operating time. For example, in Patent Document 1, as the apparatus for predicting the operating time in the power switching device such as the breaker and its method, the following are disclosed: when the breaker performs an opening or closing operation, an operating time and an environmental condition thereof are stored, and an operating characteristic parameter thereof is estimated by functional approximation of a history thereof, and hence a next operating time is predicted from the estimated operating characteristic parameter and the current environmental condition.

Meanwhile, an $SF_6$ gas typically used in the breaker has a property of freezing in a low temperature region, and thus the operating time required for the opening/closing operation varies largely.

In addition, the following matters are known in the breaker: the operating time gradually changes due to a time-dependent change (change with time) caused by abrasion of a contact thereof and so on, and there exists an amount of variation in the operating time according to a normal distribution. Further, it is also known that there is an individual difference in the time-dependent change rate and/or the amount of variation of them.

PRIOR ART DOCUMENTS

Patent Documents

Patent Document 1: Japanese Unexamined Patent Application Publication No. 2009-238673
Patent Document 2: Japanese Unexamined Patent Application Publication No. 2000-11824

SUMMARY OF THE INVENTION

Problems to be Solved by the Invention

However, in an operating characteristic parameter mechanism equipped by the aforementioned conventional apparatus for predicting the operating time in the power switching device and its method, there is a problem such that it is difficult to estimate stably the operating characteristic parameter without increasing an amount of calculation thereof.

The present invention is made to solve the aforementioned problem, and an object of the invention is to provide an apparatus for predicting an operating time in a power switching device that estimates stably the operating characteristic parameter without increasing the amount of calculation and thus achieves a high prediction accuracy of the operating time even under a condition such that it is hard to estimate the operating characteristic parameter with high accuracy and stably in the conventional way.

Means for Solving the Problems

In order to accomplish the above object, an apparatus for predicting an operating time in a power switching device according to the invention includes: an operating time measuring unit for measuring an operating time of the power switching device on the basis of an opening/closing command signal of the power switching device, and a main circuit current or an operation stroke thereof; an operation environmental condition measuring unit for measuring a current operation environmental condition including at least one of an ambient temperature, a control voltage, and an operating pressure of the power switching device; an operation history retaining unit for storing historical data of the operating time measured by the operating time measuring unit and the operation environmental condition measured by the operation environmental condition measuring unit in a manner associated with each other; an operating characteristic parameter estimating unit for estimating an operating characteristic parameter of the power switching device by functional approximation of the historical data stored in the operation history retaining unit; an operating time predicting unit for predicting a next operating time on the basis of an estimated value of the operating characteristic parameter estimated by the operating characteristic parameter estimating unit, and the current operation environmental condition of the power switching device; a feedback correcting unit for correcting the next operating time by calculating a feedback correction amount in such a manner that reference is made to a history of an error between the operating time stored in the operation history retaining unit, and the next operating time predicted by the operating time predicting unit for n times in the past with a past referenced parameter n; and a learning completion determining unit for outputting an operation start signal when it is detected that a history of an error between the operating time stored in the operation history retaining unit and the next operating time after correction by the feedback correcting unit is less than a threshold value prescribed in advance for a predetermined number of times, wherein the historical data used for the estimation of the operating characteristic parameter are the historical data extracted by a vicinity operation historical data extracting unit that extracts, from among the historical data stored in the operation history retaining unit, only the vicinity historical data that are the historical data placed in the vicinity of the value of the current operation environmental condition.

Effect of the Invention

According to the apparatus for predicting the operating time in the power switching device of invention, even under the condition that it is difficult to estimate the operating characteristic parameter with high accuracy and stably in the conventional way, when the operating time of a breaker is predicted, it is possible to estimate stably the operating characteristic parameter without increasing an amount of calculation thereof, thereby enhancing prediction accuracy of the operating time.

BEST MODE FOR CARRYING OUT THE INVENTION

Hereinafter, in order to explain the present invention in more detail, embodiments for carrying out the invention will be described with reference to the accompanying drawings.

Embodiment 1

Figure 1:
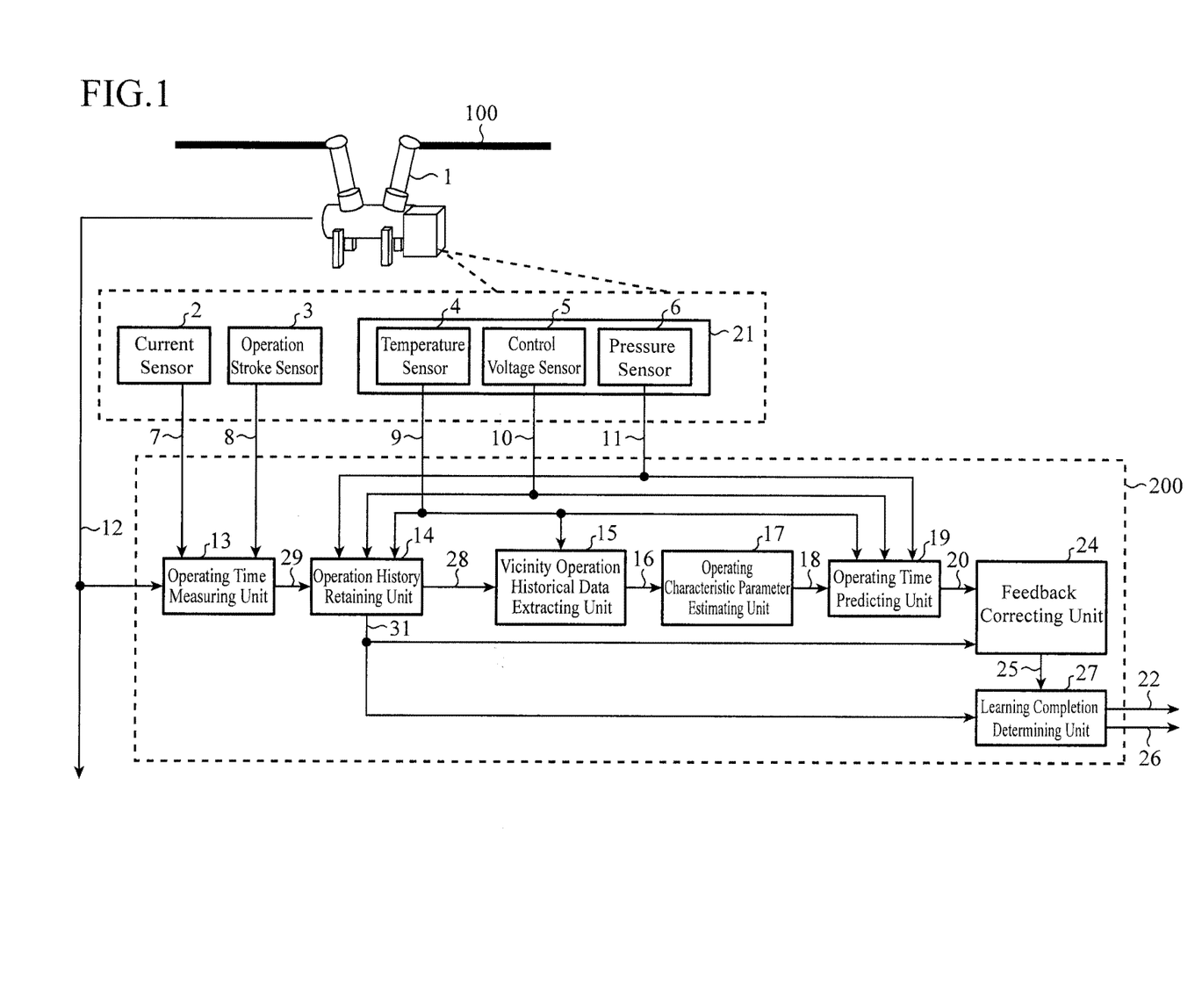
FIG. 1 is a block diagram showing a configuration of an apparatus for predicting an operating time in a power switching device (breaker 1) according to Embodiment 1 of the present invention.

FIG. 1 is a block diagram showing a configuration of an apparatus for predicting an operating time in a power switching device (breaker 1) according to Embodiment 1 of the invention. The concerned apparatus for predicting the operating time and a method thereof will be described with reference to FIG. 1.

The breaker 1 is a power switching device for a main circuit 100, and includes a variety of sensors 2 to 6, and a controller 200. The breaker 1 includes: a current sensor 2; an operation stroke sensor 3; and a temperature sensor 4, a control voltage sensor 5 and a pressure sensor 6 that constitute an operation environmental condition measuring unit 21. The current sensor 2 measures a main circuit current, and outputs a main circuit current signal 7 indicating the current to an operating time measuring unit 13; and the operation stroke sensor 3 measures an operation stroke of a contact of the breaker 1, and outputs an operation stroke signal 8 indicating the stroke to the operating time measuring unit 13. Also, the temperature sensor 4 measures an ambient temperature, and outputs an ambient temperature signal 9 indicating the temperature to an operation history retaining unit 14, a vicinity operation historical data extracting unit 15, and an operating time predicting unit 19; the control voltage sensor 5 measures a control voltage, and outputs a control voltage signal 10 indicating the voltage to the operation history retaining unit 14 and the operating time predicting unit 19; and the pressure sensor 6 measures an operating pressure, and outputs an operating pressure signal 11 indicating the pressure to the operation history retaining unit 14 and the operating time predicting unit 19.

The controller 200 of the breaker 1 is constituted by a CPU such as a digital computer, and configured by including the operating time measuring unit 13, the operation history retaining unit 14, the vicinity operation historical data extracting unit 15, an operating characteristic parameter estimating unit 17, the operating time predicting unit 19, a feedback correcting unit 24, and a learning completion determining unit 27.

Every time an opening/closing command signal 12 of the breaker 1 is input, the operating time measuring unit 13 measures the operating time that is a delay time from an input timing of the opening/closing command to a mechanically opened/closed timing of the contact of the breaker 1, and outputs the time to the operation history retaining unit 14. Here, it is assumed that in the detection of the timing in which the contact of the breaker 1 is mechanically opened/closed, the main-circuit current signal 7 or the operation stroke signal 8 is used, similarly to the prior art.

After storing the operating time 29, the ambient temperature signal 9, the control voltage signal 10, and the operating pressure signal 11 as historical data, the operation history retaining unit 14 outputs the stored contents of the ambient temperature signal 9, the control voltage signal 10, and the operating pressure signal 11 to the vicinity operation historical data extracting unit 15 as operation historical data 28; and outputs the stored contents of the operating time 29 to the feedback correcting unit 24 and the learning completion determining unit 27 as operating time historical data 31. Note that the operating time historical data 31 and the operation historical data 28 are stored with temporally associated with each other according to the time when each of the signals is detected.

The operation historical data 28 output from the operation history retaining unit 14, and the current ambient temperature signal 9 that is acquired by the temperature sensor 4 at a constant period are input to the vicinity operation historical data extracting unit 15. Then, the vicinity operation historical data extracting unit 15 extracts from among the operation historical data 28 output from the operation history retaining unit 14 only the operation historical data produced within a predetermined cut range in the vicinity of the current ambient temperature 9, and outputs the resultant as a vicinity operation historical data 16 to the operating characteristic parameter estimating unit 17.

Meanwhile, in the breaker employing an $SF_6$ gas typically used in a gas circuit breaker, it is known that the operating characteristics of the breaker are abruptly changed when the ambient temperature reaches the freezing point of a $SF_6$ gas. In the prior art, in order to approximate highly accurately the history including the said operating characteristics, it is necessary to use a higher-order function or an exponential function; however, when the concerned function is employed, the following problems and so on are involved: a calculation amount thereof is increased; an amount of variation of a parameter thereof for every operation are enlarged to make the operation unstable; and necessity of repetitive calculations falls into a localized solution to thus render the operation unstable.

Figure 2:
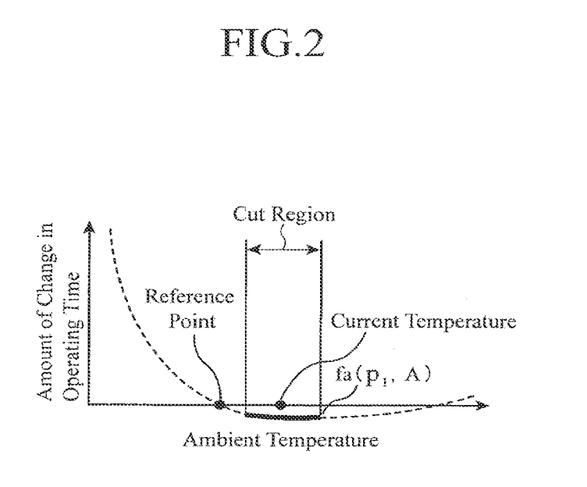
FIG. 2 is a diagram showing an operation of a vicinity operation historical data extracting unit according to Embodiment 1 of the invention.

FIG. 2 is a schematic diagram in which in the vicinity operation historical data extracting unit 15 only the operation historical data produced in the vicinity (within a predetermined cut region) of the current temperature are extracted from among the operation historical data 28, and the extracted vicinity operation historical data 16 are approximated by a lower-order elementary function. According to the present configuration, since the vicinity operation historical data 16 is contemplated for approximation of function, an approximation with high accuracy can be achieved even with the use of a lower-order elementary function; thus, the following problems having been posed as those in the prior art can be overcome: the use of the higher-order function or exponential function increases the calculation amount; in the high-order function, the amount of variation of the parameter for every operation is enlarged to render the operation unstable; and when in the exponential function, the use of a solution by the repetitive calculations falls into the localized solution to thus make it impossible to seek a solution thereof in some cases.

Incidentally, in the embodiment, only the ambient temperature signal 9 among the operation environmental conditions is input to the vicinity operation historical data extracting unit 15; however, it may be naturally configured such that another operation environmental condition of the control voltage signal 10 and so on is input to the vicinity operation historical data extracting unit 15.

Next, the operating characteristic parameter estimating unit 17 calculates respective operating characteristic parameters 18 in opening and closing thereof based on the vicinity operation historical data 16. A method for determining the operating characteristic parameters 18 will be described in detail below.

First, the operating time of the breaker 1 is considered a result where an ambient temperature correction, a control voltage correction, an operating pressure correction, and a quiescent time correction are carried out during an operating time in a rated condition, assuming that their relationships are independent from each other. That is, it is represented by the following formula.

Operating time of the breaker 1=(operating time at a rated voltage)+(ambient temperature correcting function)+(control voltage correcting function)+(operating pressure correcting function)+(quiescent time correcting function)  (1)

Here, in the rated condition, the ambient temperature is Astd, the control voltage is Vstd, the operating pressure is Pstd, and the quiescent time is Istd, and further the operating time in the rated condition is Tstd. The rated condition may be arbitrarily established, and the following are provided, for example: Astd=20° C., Vstd=125 V, Pstd=29 MPa, and Istd=24 hrs. Then, the ambient temperature correcting function is represented by a function fa($p_1$, A) that is dependent on an unknown parameter $p_1$ and an ambient temperature A. Also, the control voltage correcting function is represented by a function fv($p_2$, V) that is dependent on an unknown parameter $p_2$, and a control voltage V. Also, the operating pressure correcting function is represented by a function fp($p_3$, P) that is dependent on an unknown parameter $p_3$ and an operating pressure P. Also, the quiescent time correcting function is represented by a function fi($p_4$, I) that is dependent on an unknown parameter $p_4$ and a quiescent time I. Here, the functions of fa($p_1$, A), fv($p_2$, V), fp($p_3$, P), and fi($p_4$, I) are arbitrary ones to be defined in advance based on the structure of the breaker 1.

When the above variables are used, the formula (1) can be written as follows.

Operating time of the breaker=Tstd+fa($p_1$,A)+fv($p_2$,V)+fp($p_3$,P)+fi($p_4$,I)  (2)

That is, the determination method of the operating characteristic parameters 18 can be said differently as a method to determine unknown parameters of Tstd, $p_1$, $p_2$, $p_3$ and $p_4$ in the formula (2) from the operation historical data. Note that in this embodiment, the operation historical data to be used for determining the unknown parameters in the formula (2) are the vicinity operation historical data 16.

Next, among the stored operation historical data, an ambient temperature, a control voltage, an operating pressure, a quiescent time, and an operating time measured value at the time of an operation at a k-th time (k is a natural number) are designated as A(k), V(k), P(k), I(k), and T(k), respectively; it is assumed that the operation historical data for m times are currently stored. Attention should be paid to the fact that referenced operation historical data are different from each other in opening and closing thereof. In this instance, an operating time measured value at the k-th time is represented by the following expression with a formula (3).

T(k)=Tstd+fa($p_1$,A(k))+fv($p_2$,V(k))+fp($p_3$,P(k))+fi($p_4$,I(k))  (3)

When the operation historical data for m times are provided, m formulae (3) are established simultaneously. In order to determine the unknown parameters Tstd, $p_1$, $p_2$, $p_3$, and $p_4$ from these formulae, it is just needed to find a value such that a square error between the left-side and right-side values in the formula (3) becomes minimum. That is, it is only needed to determine the unknown parameters such that the square error represented from the formula (3) becomes minimum. Note that in this instance it is defined as the weight coefficient w(k)=1 for the number k=1 to n.

$$\text{Square error} = \sum_{k=1}^{n} w(k) \left( T(k) - \left( \begin{matrix} Tstd + fa(p_1, A(k)) + fv(p_2, V(k)) + \\ fp(p_3, P(k)) + fi(p_4, I(k)) \end{matrix} \right) \right)^2 \quad (4)$$

A large number of known methods are proposed on how to determine the unknown parameters such that the square error becomes minimum, and any of the methods may be used. From the above, the operating characteristic parameters 18 (Tstd, $p_1$, $p_2$, $p_3$ and $p_4$) are determined.

The operating time predicting unit 19 outputs a first predicted operating time 20 on the basis of the operating characteristic parameters 18 output from the operating characteristic parameter estimating unit 17, and the current operation environmental conditions 9 to 11. Specifically, the first predicted operating time 20 that is the next operating time is calculated and output with the current ambient temperature A, control voltage V, operating pressure P, and quiescent time I. When the operating characteristic parameters 18 and the operation environmental conditions 9 to 11 are substituted into the formula (2), the operating time of the breaker can be found as the first predicted operating time 20. Note that attention should be paid to the fact that different operation historical data are used in opening and closing thereof, respectively.

Figure 3:
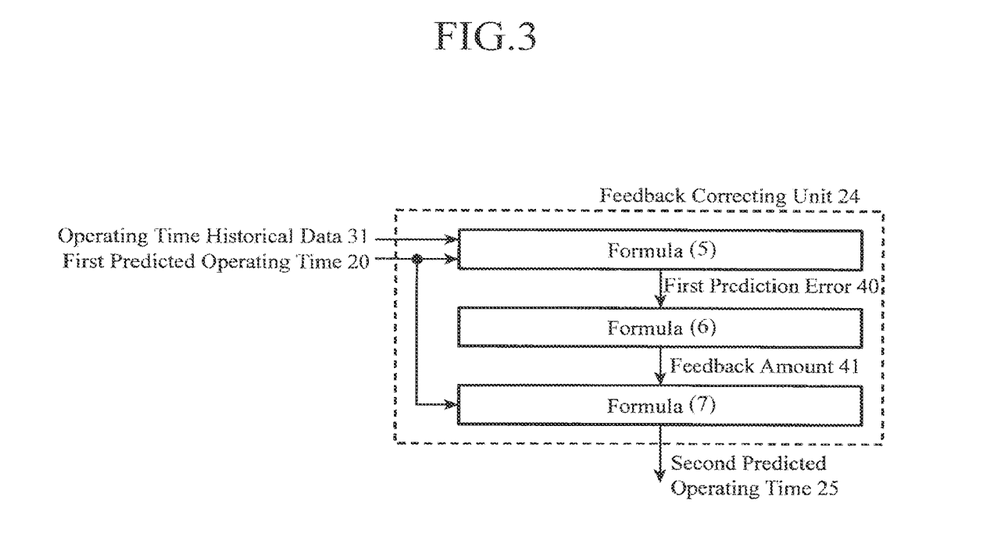
FIG. 3 is a flowchart for a feedback correcting unit.

The feedback correcting unit 24 is configured as shown in FIG. 3, and corrects the first predicted operating time 20 according to the history of the first predicted operating time 20 output from the operating time predicting unit 19 and the operating time historical data 31 output from the operation history retaining unit 14, and outputs newly a second predicted operating time 25. Specifically, according to a formula (5), a first prediction error 40 is calculated on the basis of the first predicted operating time 20 and the operating time historical data 31.

First prediction error 40=operating time historical data 31−first predicted operating time 20  (5)

Next, according to a formula (6), based on a past referenced parameter n, reference is made to the first prediction error 40 for n times in the past, and a feedback amount 41 is calculated as their average value. Here, the past referenced parameter is a parameter defining for how many times reference is made to the data in the past to be used for calculations.

$$\text{Feedback amount } 41 = \sum_{ni=1}^{n} (\text{past } ni\text{-th first prediction error } 40)/n \qquad (6)$$

Lastly, according to a formula (7), the feedback amount 41 is added to the first predicted operating time 20 to calculate the second predicted operating time 25, and then output the resultant to the learning completion determining unit 27.

Second predicted operating time 25=first predicted operating time 20+feedback amount 41 (7)

The second prediction error 42 after the feedback correction is performed by the formula (7) is given by a formula (8).

Second prediction error 42=operating time historical data 31−second predicted operating time 25 (8)

The feedback correcting unit 24 renders an effect to remove an offset-like error in the first predicted operating time 20 that is caused by the matter that the estimated operating characteristic parameter 18 becomes a different result from that in the latest operation history due to a time-dependent change of the breaker (gradual change in operating time caused by abrasion of the contact of the breaker and so on).

The learning completion determining unit 27 outputs an operation start signal 22 and a third predicted operating time 26 based on the second predicted operating time 25 output from the feedback correcting unit 24 and the operating time historical data 31 output from the operation history retaining unit 14, that is, based on the second prediction error 42. Specifically, when the second prediction error 42 is within a predetermined range determined in advance successively for a predetermined number of times determined in advance, it is considered that the operating characteristic parameter is properly estimated to thus determine properly the predicted operating time, and hence the operation start signal 22 is ON-output. When the operation start signal 22 is not ON, it is contemplated that an average value of the operating time historical data 31 is determined as the third predicted operating time 26. Also, the third predicted operating time 26 is a finally predicted operating time.

Incidentally, it may be configured that the operating times in opening and closing thereof are determined separately, or determined without separation. Also, when the number of the vicinity operation historical data 16 output from the vicinity operation historical data extracting unit 15 is less than the order of the function of approximation, it is impossible to calculate the operating characteristic parameter; thus, it is contemplated that a given initial value or an average value of the operating time historical data 31 is taken as the third predicted operating time 26.

According to the above embodiment, even under the condition that it is difficult to estimate the operating characteristic parameter with high accuracy and stably in the conventional method, such that the power switching device is used in a cold district, so that the ambient temperature reaches the freezing point of the $SF_6$ gas generally used in the breaker, the operating time required for the opening/closing operation is changed abruptly, when the operating time of the breaker is predicted, the operating characteristic parameter is estimated stably without increasing the calculation amount thereof and hence the operating time thereof can be predicted with high accuracy.

Embodiment 2

Figure 4:
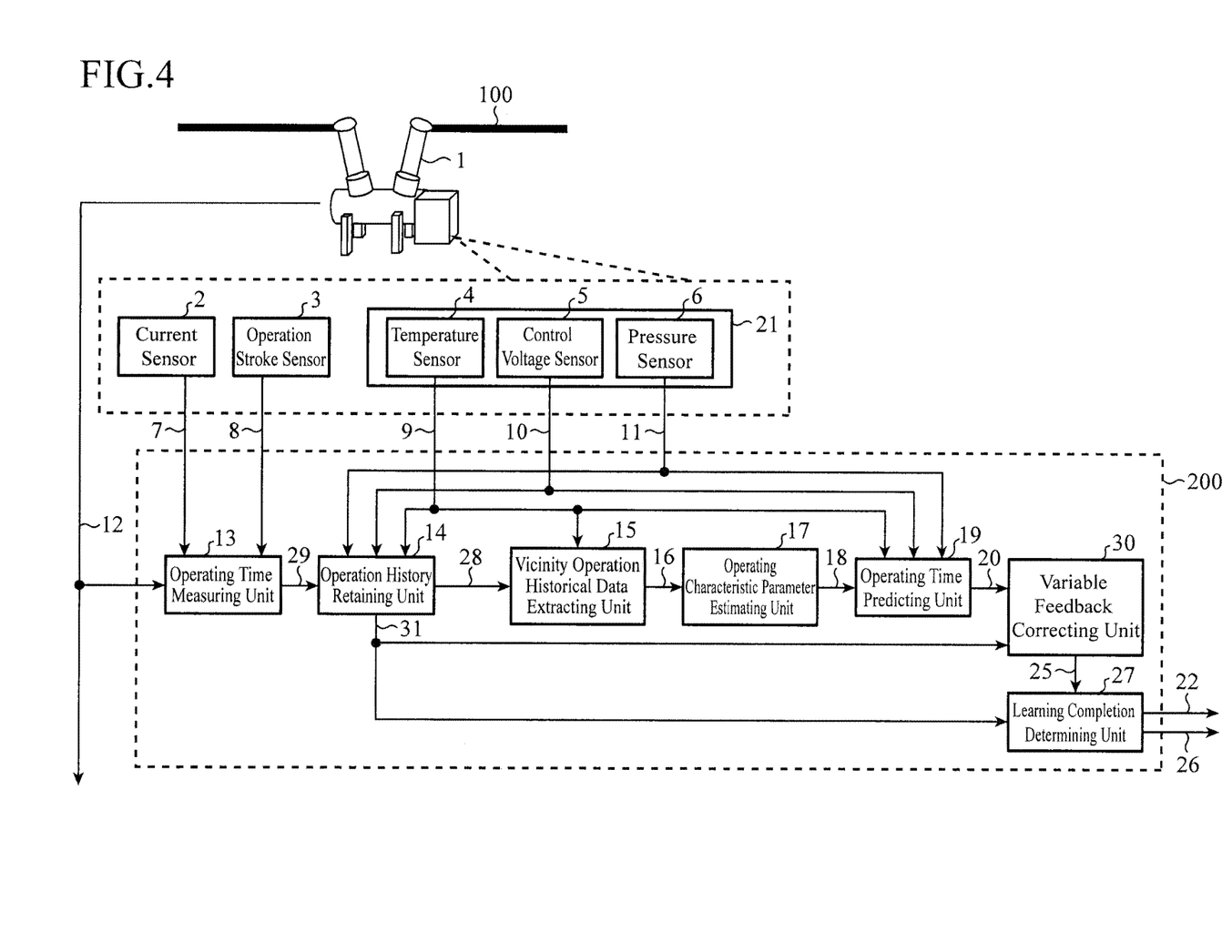
FIG. 4 is a block diagram showing a configuration of an apparatus for predicting an operating time in a power switching device (breaker 1) according to Embodiment 2 of the invention.

FIG. 4 is a diagram showing a configuration of Embodiment 2 of the present invention. This embodiment is such that the feedback correcting unit 24 in Embodiment 1 is replaced with a variable feedback correcting unit 30; thus, it is configured that the said second prediction error 42 becomes smaller.

As compared with that of the feedback correcting unit 24, the variable feedback correcting unit 30 serves to correct further an offset-like error in a first predicted operating time 20 in which an estimated operating characteristic parameter 18 is produced as a result different from that in the latest operation history due to a time-dependent change of the breaker (gradual change in operating time caused by abrasion of the contact of the breaker and so on).

Figure 5:
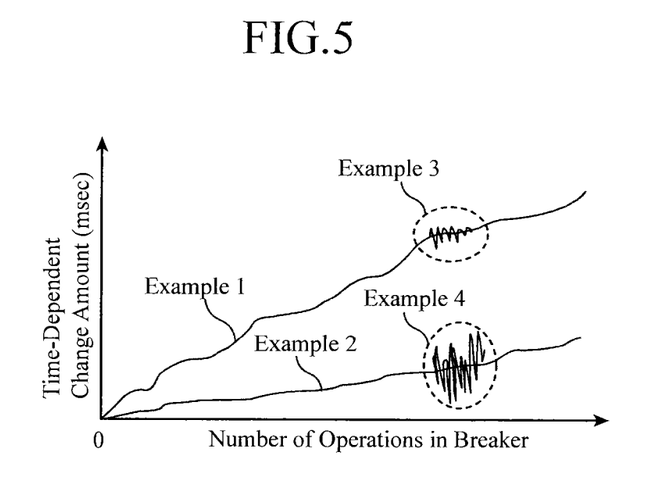
FIG. 5 is a diagram illustrating aspects in time-dependent changes of the breaker 1.

FIG. 5 is a diagram showing an example of a time-dependent change of the breaker 1. In FIG. 5, two graphs indicate the time-dependent changes about two breakers. Then, the slopes of Example 1 and Example 2 correspond to the time-dependent change rates of the breakers; it is known that there are individual differences in the time-dependent change rates. Therefore, it is difficult to determine a feedback amount 41 in such a manner that the time-dependent change rate is defined preliminarily and uniformly.

In order to eliminate more effectively the influence of the time-dependent change, it is necessary to determine the feedback amount 41 from a first prediction error 40 provided as recently as possible, that is, to use "n" in the formula (6) as small as possible.

A vicinity operation historical data 16 to be input to an operating characteristic parameter estimating unit 17 are influenced by the time-dependent change. As the operation history in the past is older, it is affected stronger by the time-dependent change to be thus different from that of the latest operating characteristic, and hence also in the feedback correcting unit 24 it is desirable to calculate the feedback amount 41 on the basis of the most recent first prediction errors 40 to determine a second predicted operating time 25. That is, it is desirable that the value of the past referenced parameter n in the formula (6) is as small as possible.

However, it is known that in the breaker an amount of variation in the operating time exists according to a normal distribution. Also, with respect to the amount of variation, it is known that an individual difference exists for every breaker as shown by Example 3 and Example 4 in FIG. 5. In the formula (6), since an average value of the first prediction error 40 that is a value including the amount of variation is calculated, the feedback value 41 becomes a value including the amount of variation. Accordingly, the second prediction error 42 also becomes a value including the amount of variation. In order to decrease the second prediction error 42 according to the amount of variation, it is desirable to calculate the feedback amount 41 on the basis of as many first prediction errors 40 as possible to determine the second predicted operating time 25. That is, it is desirable that the value of the past referenced parameter n in the formula (6) is as large as possible.

As mentioned above, there is a trade-off relationship in the past referenced parameter n between both errors produced by the influence of the time-dependent change and the one of the amount of variation.

Thus, in this embodiment, it is configured that the second prediction error 42 becomes smaller in such a manner that the errors produced by the influence of the time-dependent change and the one of the amount of variation are represented quantitatively, and that an evaluation formula for determining an optimum past referenced parameter n is introduced.

Since the error caused by the time-dependent change is an offset-like error, it can be evaluated with an average value $|\mu|$ of the second prediction errors 42, while since the error caused by the amount of variation is an error according to the normal distribution, it can be evaluated with a standard deviation $\sigma$ of the second prediction errors 42.

Figure 6:
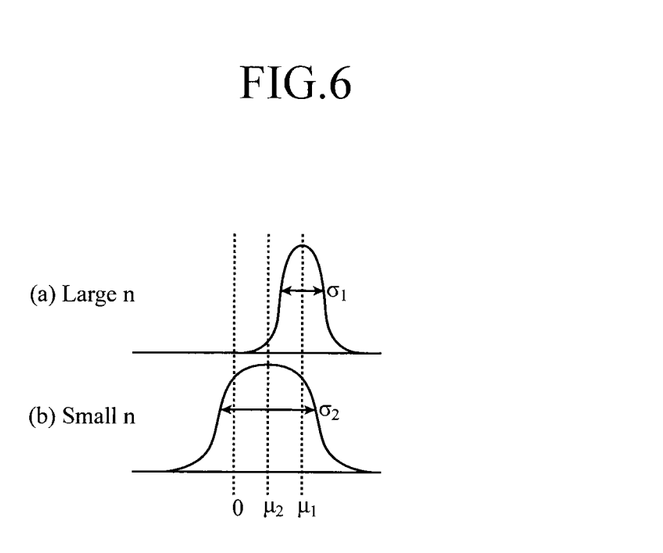
FIG. 6 is a diagram illustrating that in Embodiment 2 of the invention, when a value of n is changed, an average value and a standard deviation of prediction errors are changed.

A relationship among the past referenced parameter n, the average value $|\mu|$ of the second prediction errors 42, and the standard deviation $\sigma$ of the second prediction errors 42 will be described with reference to FIG. 6. The average value $|\mu|$ and the standard deviation $\sigma$ of the second prediction errors 42 change depending on the past referenced parameter n. When the past referenced parameter n is made larger, the average value is calculated by referring to a large number of histories, and hence the standard deviation $\sigma$ of the second prediction error 42 becomes smaller. When no time-dependent change exists, the average value $|\mu|$ of the second prediction errors 42 is zero, so that the larger the past referenced parameter n, the smaller the second prediction error 42 becomes. However, since the time-dependent change exists in the breaker, the average value $|\mu|$ of the second prediction errors 42 is not zero, and as the value of the past referenced parameter n is larger, reference is made to the past operating time historical data 31 that are influenced more greatly by the time-dependent change; thus, as shown in FIG. 6(a), the standard deviation $\sigma_1$ is small, whereas the average value $|\mu_1|$ is increased, resulting in deteriorating the prediction accuracy of the operating time.

In contrast, when the value of the past referenced parameter n is smaller, reference is made to only the recent operating time historical data 31 that are less influenced by the time-dependent change; thus, as shown in FIG. 6(b), the average value $|\mu_2|$ is small, whereas the standard deviation $\sigma$ is increased since an average value is calculated from a small number of ones of the first prediction error 40 that is a value including the amount of variation, resulting in deteriorating the prediction accuracy of the operating time.

In the prior art, the past referenced parameter n is determined as a fixed value before start of use, but not a value to be determined in consideration of the individual difference of the time-dependent change rate and the individual difference of the amount of variation. Further, assuming that the breaker is used on a long-term basis, in a case of the occurrence of a situation such that the amount of variation or the time-dependent change rate changes, the accuracy of the feedback at the time of the above occurrence of the change is deteriorated in the past referenced parameter n that is a fixed value.

Figure 7:
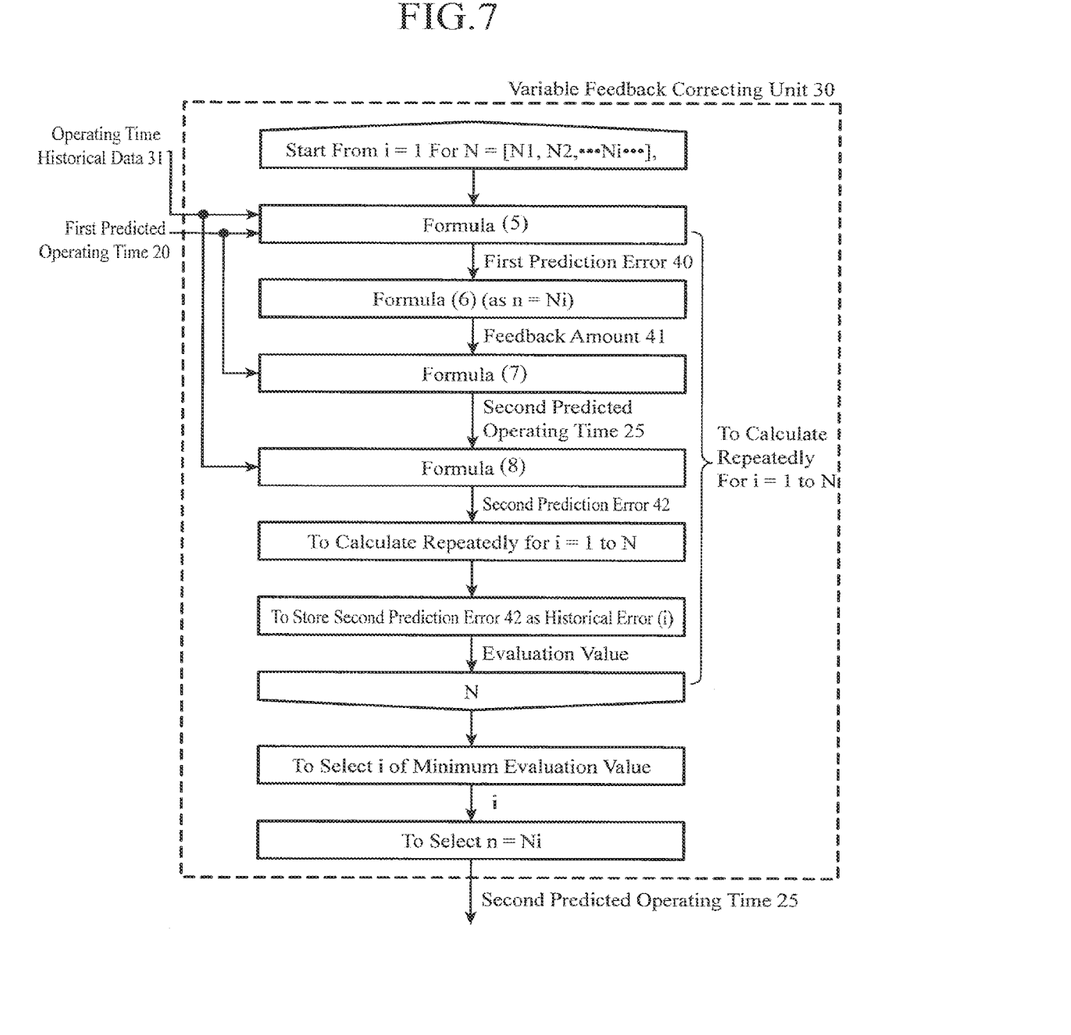
FIG. 7 is a flowchart for a variable feedback correcting unit.

FIG. 7 is a configuration of the variable feedback correcting unit 30 according to this embodiment. Hereinafter, an operation thereof will be described.

For the past referenced parameter n, several values to be taken as candidates are determined in advance as N=[N1, N2, ... , Ni, ... ]. The second prediction errors 42 are calculated for the respective values Ni, and their error histories (i) are stored therein. In a timing where the past referenced parameter n determined in advance is renewed, the evaluation value at the time when each of the values Ni is used is calculated by referring to the history of the second prediction error 42. For an evaluation formula for calculating the evaluation value, for example, a formula (9) and a formula (10) are provided.

Evaluation value=(standard deviation of second prediction error 42 in past Ni time)+|(average value of second prediction error 42 in past Ni time)| (9)

Evaluation value=(standard deviation of second prediction error 42 in past Ni time)×|(average value of second prediction error 42 in past Ni time)| (10)

The above evaluation formulae indicate quantitatively the error produced by the influence of the time-dependent change and the error produced by the one of the amount of variation. When the Ni minimizing the evaluation value is selected, the second prediction error 42 can be minimized.

It should be adapted to follow automatically the situation that the amount of variation or the time-dependent change rate changes in such a manner that the timing where the past referenced parameter n is renewed may be selected for every operation of the breaker, for every fixed number of times of the operation thereof, or for every fixed lapse of time thereof.

According to the above embodiment, it is possible to enhance the prediction accuracy of the operating time in consideration of the individual difference for each breaker in the amount of variation and the time-dependent change rate. Also, it is possible to obtain further an effect such that the prediction accuracy of the operating time is enhanced in a manner to follow automatically the change in the amount of variation or the time-dependent change rate to be produced during the operation.

Embodiment 3

Figure 8:
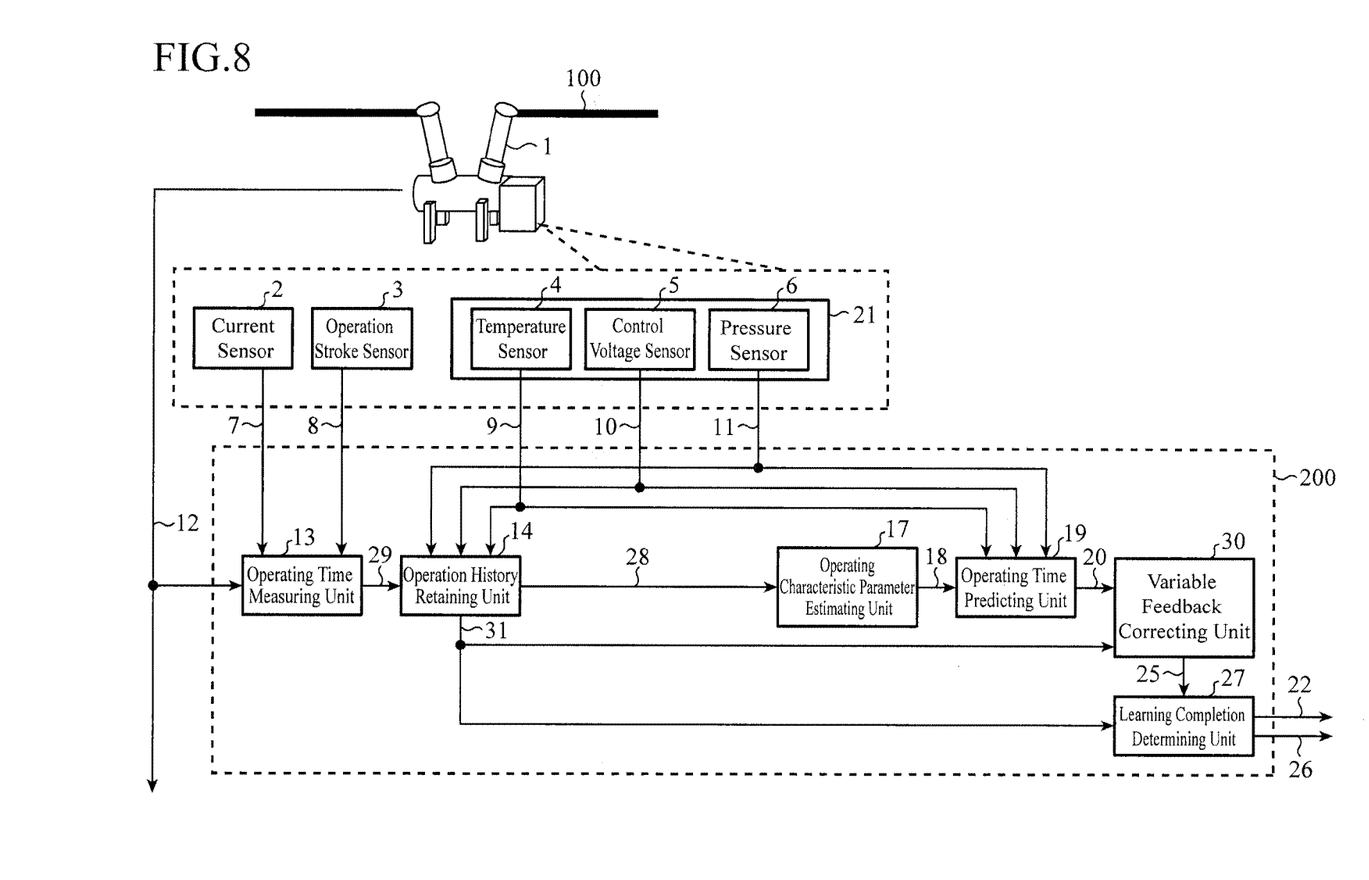
FIG. 8 is a block diagram showing a configuration of an apparatus for predicting an operating time in a power switching device (breaker 1) according to Embodiment 3 of the invention.

FIG. 8 is a diagram showing a configuration of Embodiment 3 of the present invention. This embodiment has a configuration not including the vicinity operation historical data extracting unit 15 in Embodiment 1, and including the variable feedback correcting unit 30 in place of the feedback correcting unit 24, similarly to Embodiment 2.

Even in this embodiment, since the variable feedback correcting unit 30 is used similarly to Embodiment 2, the second prediction error 42 can be reduced, and hence the prediction accuracy of the operating time can be enhanced in consideration of the individual difference for every breaker in the amount of variation and the time-dependent change rate. Further, an effect to enhance the prediction accuracy of the operating time can be obtained in a manner to follow automatically the change in the amount of variation or the time-dependent change rate to be produced during the operation.

It is noted that in the present invention, it is possible to freely combine the embodiments, modify any component of the embodiments, or omit any component in the embodiments within the scope of the invention.

INDUSTRIAL APPLICABILITY

As describe above, since the apparatus for predicting the operating time of the power switching device according to the invention has a configuration taking into consideration the ambient operation environment or aged change, it is suitable for a use under the condition that it is difficult to estimate the operating characteristic parameter with high accuracy and stably in the conventional method.

DESCRIPTION OF REFERENCE NUMERALS AND SIGNS

1: breaker, 2: current sensor, 3: operation stroke sensor, 4: temperature sensor, 5: control voltage sensor, 6: pressure sensor, 7: main circuit current signal, 8: operation stroke signal, 9: ambient temperature signal, 10: control voltage signal, 11: operating pressure signal, 12: opening/closing command signal, 13: operating time measuring unit, 14: operation history retaining unit, 15: vicinity operation historical data extracting unit, 16: vicinity operation historical data, 17: operating characteristic parameter estimating unit, 18: operating characteristic parameter, 19: operating time predicting unit, 20: first predicted operating time, 21: operation environmental condition measuring unit, 22: operation start signal, 24: feedback correcting unit, 25: second predicted operating time, 26: third predicted operating time, 27: learning completion determining unit, 28: operation historical data, 29: operating time, 30: variable feedback correcting unit, 31: operating time historical data, 40: first prediction error, 41: feedback amount, 42: second prediction error, 100: main circuit, 200: controller.

The invention claimed is:

1. A system for predicting an operating time in a power switching device and controlling an operating time of an opening or closing operation of the power switching device, the system comprising:
the power switching device;
an operation environmental condition measuring unit including a plurality of sensors that measure a current operation environmental condition including at least one of an ambient temperature, a control voltage, and an operating pressure of the power switching device; and
a controller that controls the operating time of the opening or closing operation of the power switching device based on corrected next operating times, the controller being programmed to perform as
an operating time measuring unit that measures an operating time of the power switching device on the basis of an opening/closing command signal of the power switching device, and a main circuit current or an operation stroke of the power switching device,
an operation history retaining unit that stores historical data of the operating time measured by the operating time measuring unit and the operation environmental condition measured by the operation environmental condition measuring unit in a manner associated with each other,
a vicinity operation historical data extracting unit that extracts, from among the historical data stored in the operation history retaining unit, only vicinity historical data, which is the historical data having an operation environmental condition within a predetermined range of a current operation environmental condition,
an operating characteristic parameter estimating unit that estimates an operating characteristic parameter of the power switching device by functional approximation of the vicinity historical data extracted by the vicinity operation historical data extracting unit,
an operating time predicting unit that predicts next operating times of the power switching device on the basis of an estimated value of the operating characteristic parameter estimated by the operating characteristic parameter estimating unit, and the current operation environmental condition of the power switching device,
a variable feedback correcting unit that, with respect to N different parameter candidates being candidates for a reference parameter, where N is an integer value larger than 1, calculates each of N feedback candidate amounts based on a corresponding one of the N parameter candidates, and produces N sets of candidate corrected operating times based on the N feedback candidate amounts, the variable feedback correcting unit further calculating, for each of the N sets of candidate corrected operating times, an evaluation value that is a sum or product of a standard deviation of the candidate correcting operating times and an average of the candidate corrected operating times, and selecting, as the reference parameter, one of the N parameter candidates corresponding to the smallest evaluation value, and the variable feedback correcting unit further calculating a plurality of first errors between historical data of the next operating times and historical data of actual operating times measured by the operating time measuring unit, calculating a feedback correction amount based on n first errors obtained from the plurality of first errors where n is an integer value of a reference parameter, and thereafter corrects the next operating times by adding the feedback correction amount to the next operating times to thereby produce the corrected next operating times, and
a learning completion determining unit that outputs an operation start signal when second errors between the actual operating times and the corrected next operating times are detected as being less than a threshold value prescribed in advance for a predetermined number of times.

2. The system according to claim 1, wherein the feedback correction amount is calculated as an average value of the n first errors.

3. A system for predicting an operating time in a power switching device and controlling an operating time of an opening or closing operation of the power switching device, the system comprising:
the power switching device;
an operation environmental condition measuring unit including a plurality of sensors that measure a current operation environment condition of the power switching device; and
a controller that controls the operating time of the opening or closing operation of the power switching device based on corrected next operating times, the controller being programmed to perform as
an operating time measuring unit that measures an operating time of the power switching device on the basis of an opening/closing command signal of the power switching device, and a main circuit current or an operation stroke of the power switching device,
an operation history retaining unit that stores historical data of the operating time measured by the operating time measuring unit and the operation environmental condition measured by the operation environmental condition measuring unit in a manner associated with each other,
an operating characteristic parameter estimating unit that estimates an operating characteristic parameter of the power switching device by functional approximation of the historical data stored in the operation history retaining unit, an operating time predicting unit that predicts next operating times of the power switching device on the basis of an estimated value of the operating characteristic parameter estimated by the operating characteristic parameter estimating unit, and the current operation environmental condition of the power switching device, a variable feedback correcting unit that, with respect to N different parameter candidates being candidates for a reference parameter where N is an integer value larger than 1, calculates each of N feedback candidate amounts based on a corresponding one of the N parameter candidates, and produces N sets of candidate corrected operating times based on the N feedback candidate amounts, the variable feedback correcting unit further calculating, for each of the N sets of candidate corrected operating times, an evaluation value that is a sum or product of a standard deviation of the candidate corrected operating times and an average of the candidate corrected operating times, and selecting, as the reference parameter, one of the N parameter candidates corresponding to the smallest evaluation value, and the variable feedback correcting unit further calculating a plurality of first errors between historical data of the next operating times and historical data of actual operating times measured by the operating time measuring unit, calculating a feedback correction amount based on n first errors obtained from the plurality of first errors where n is an integer value of the reference parameter, and thereafter correcting the next operating times by adding the feedback correction amount to the next operating times to thereby produce the corrected next operating times, and a learning completion determining unit that outputs an operation start signal when second errors between the actual operating times and the corrected next operating times are detected as being less than a threshold value prescribed in advance for a predetermined number of times.

4. The system according to claim 3, wherein the feedback correction amount is calculated as an average value of the n first errors.

5. A method for predicting an operating time in a power switching device and controlling an operating time of an opening or closing operation of the power switching device, the method comprising:

measuring an operating time of the power switching device on the basis of an opening/closing command signal of the power switching device, and a main circuit current or an operation stroke of the power switching device;

measuring a current operation environmental condition including at least one of an ambient temperature, a control voltage, and an operating pressure of the power switching device;

storing historical data of the operating time measured by the operating time measuring and the operation environmental condition measured by the operation environmental condition measuring in a manner associated with each other;

extracting from the stored historical data, only vicinity historical data, which is the stored historical data having an operation environmental condition within a predetermined range of a current operation environmental condition;

estimating an operating characteristic parameter of the power switching device by functional approximation of the vicinity historical data extracted by the extracting;

predicting next operating times of the power switching device on the basis of an estimated value of the operating characteristic parameter estimated by the estimating, and the current operation environmental condition of the power switching device;

calculating a plurality of first errors between historical data of the next operating times and historical data of actual operating times measured by the operating time measuring;

calculating each of N feedback candidate amounts based on a corresponding one of N parameter candidates, each being a candidate for a reference parameter, where N is an integer value larger than 1;

producing N sets of candidate corrected operating times based on the N feedback candidate amounts;

calculating, for each of the N sets of candidate corrected operating times, an evaluation value that is a sum or product of a standard deviation of the candidate corrected operating times and an average of the candidate corrected operating times;

selecting, as the reference parameter, one of the N parameter candidates corresponding to the smallest evaluation value;

calculating a feedback correction amount based on n first errors obtained from the plurality of first errors where n is an integer value of the reference parameter;

correcting the next operating times by adding the feedback correction amount to the next operating times to thereby produce the corrected next operating times;

outputting an operation start signal when second errors between the actual operating times and the corrected next operating times are detected as being less than a threshold value prescribed in advance for a predetermined number of times;

controlling the operating time of the opening or closing operation of the power switching device based on the corrected next operating times and the operation start signal.

6. The method according to claim 5, wherein the feedback correction amount is calculated as an average value of the n first errors.

* * * * *